United States Patent [19]

Abe

[11] 4,155,074
[45] May 15, 1979

[54] DATA COLLECTION SYSTEM

[75] Inventor: Takeshi Abe, Yokohama, Japan

[73] Assignee: Ricoh Company, Ltd., Tokyo, Japan

[21] Appl. No.: 833,570

[22] Filed: Sep. 15, 1977

[30] Foreign Application Priority Data

Sep. 17, 1976 [JP] Japan .................................. 51-111625

[51] Int. Cl.² .............................................. H04Q 9/00
[52] U.S. Cl. ............................. 340/152 R; 340/168 R; 340/203
[58] Field of Search ............... 340/151, 152 R, 168 B, 340/168 R, 203

[56] References Cited

U.S. PATENT DOCUMENTS

| 3,828,313 | 8/1974 | Schull | 340/151 |
| 4,081,787 | 3/1978 | Lee | 340/172 |

Primary Examiner—Donald J. Yusko
Attorney, Agent, or Firm—Burgess, Ryan and Wayne

[57] ABSTRACT

A data collection system wherein the data in remotely located terminal equipment are read out through three transmission lines by a data collection station. The data collection station selects a terminal equipment and supplies power and clock pulses to the selected terminal equipment. The data in the selected terminal are sequentially read out in response to the clock pulses and collected in the data collection station.

3 Claims, 5 Drawing Figures

DATA COLLECTION SYSTEM

DETAILED DESCRIPTION

The present invention relates to a data collection system which is small in scale and inexpensive to install and operate and which uses three transmission lines for remotely measuring and registering the amount of electricity, water or gas consumed for a predetermined period of time.

There have been invented and demonstrated various data collection systems wherein a data collection station and a large number of terminal equipments are interconnected with three data transmission lines for remotely measuring and registering the amount of electricity, water or gas consumed by each consumer for a predetermined time interval.

Figure 1:
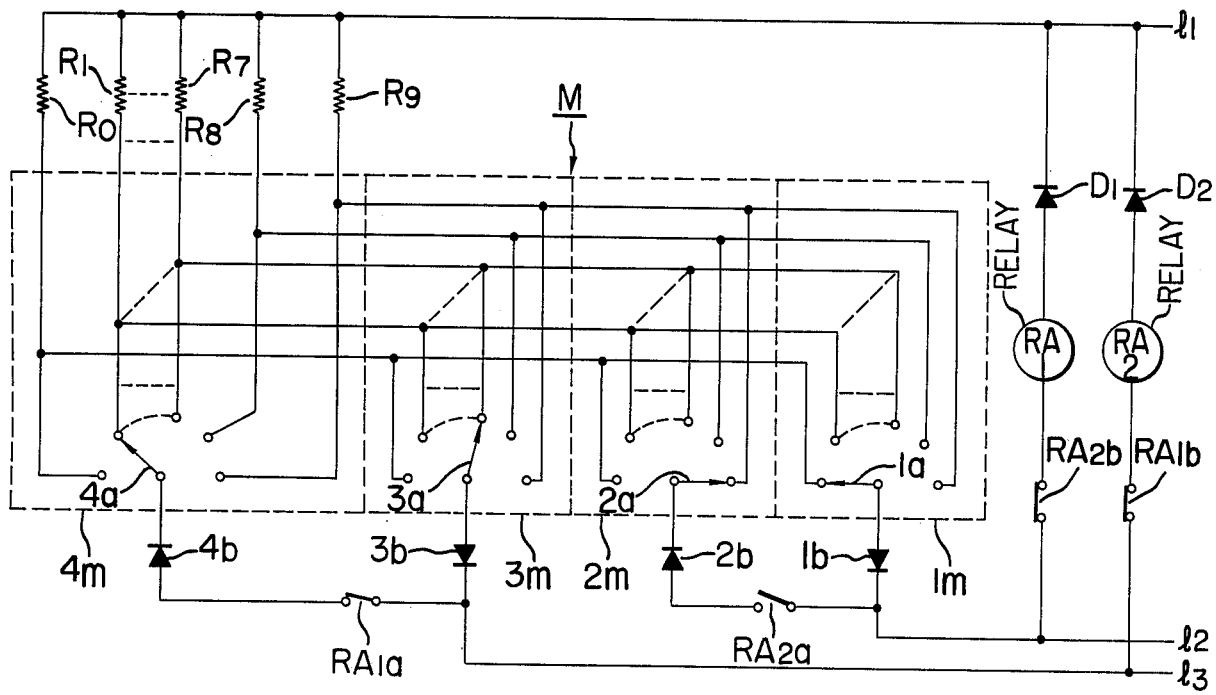
FIG. 1 is a circuit diagram of a prior art three-data-transmission line type data collection system.

In FIG. 1 there is shown one example of a terminal equipment of a prior art three-transmission-line type data collection system. The amount of electricity, water or gas consumed is measured and registered by a meter M in a terminal equipment and is transmitted through three data transmission lines $l_1$, $l_2$ and $l_3$ to a data collection station (not shown) in a manner as will be described in detail below. The meter M is installed for each house or the like for measuring the amount of electricity, water or gas consumed. Digits of units, tens, hundreds and thousands 1m, 2m, 3m and 4m have movable contacts 1a, 2a, 3a and 4a, respectively. The meter M is electrically connected through the data transmission lines $l_1$, $l_2$ and $l_3$ to the data collection station (not shown). When the data collection station impresses a predetermined magnitude of positive voltage on the data transmission line $l_1$ and a predetermined magnitude of negative voltage on the data transmission line $l_2$, current flows from the data transmission line $l_1$, a resistor $R_0$, the contact 1a of the digit of units 1m and a diode 1b to the data transmission line $l_2$. Under the conditions shown in FIG. 1 the magnitude of this current is dependent upon the value of the resistor $R_0$ and is interpreted by the data collection station as "0". In order to read the digit of tens 2m, the data collection station impresses a negative voltage on the data transmission line $l_1$ and a positive voltage on the data transmission line $l_3$ and energizes a relay $RA_2$ to close a normally open contact $RA_{2a}$ so as to interconnect between the diodes 1b and 2b and to open a normally closed contact $RA_{2b}$ so as to de-energize a relay $RA_1$. As a result, a normally open contact $RA_{1a}$ of the relay $RA_1$ is opened to interrupt the connection between diodes 3b and 4b. Thereafter, a positive voltage is impressed on the data transmission line $l_2$ while a negative voltage is impressed on the data transmission line $l_1$ so that current flows from the data transmission line $l_2$ through the relay contact $RA_{2a}$, the diode 2b, the contact 2a of the tens digit 2m and a resistor $R_9$ to the data transmission line $l_1$. The magnitude of this current is dependent upon the value of the resistor $R_9$ and is read by the data collection station as "9". Next a positive voltage is impressed on the data transmission line $l_1$ while a negative voltage, on the data transmission line $l_3$ so that the relay $RA_2$ is de-energized and current flows from the data transmission line $l_1$ through a resistor $R_7$, the contact 3a of the hundreds digit 3m and the diode 3b to the data transmission line $l_3$. The magnitude of this current is dependent upon the value of the resistor $R_7$ and is interpreted as "7" by the data collection station. The detection of the thousands digit 4m is carried out in a manner substantially similar to that used for the detection of the tens digit 2m. That is, a positive voltage is impressed on the data transmission line $l_2$ while a negative voltage, on the data transmission line $l_1$ so that the relay $RA_1$ is energized while the relay $RA_2$ is de-energized. As a result, the connection between the diodes 1b and 2b is cut off while the diodes 3b and 4b are interconnected to each other. Thereafter, a positive voltage is impressed on the data transmission line $l_3$ while a negative voltage, on the transmission line $l_1$ so that current flows from the data transmission line $l_3$ through the normally open contact $RA_{1a}$ of the relay $RA_1$, the diode 4b, the contact 4a of the thousands digit 4m and a resistor $R_1$ to the data transmission line $l_1$. Thus the thousands digit 4m is detected as "1".

In the data collection system shown in FIG. 1 the current flowing through the relay $RA_1$ or $RA_2$ is completely isolated from the current flowing through the resistors $R_0$ through $R_9$. That is, the current flowing through the resistors $R_0$ through $R_9$ will not flow through the relay $RA_1$ or $RA_2$ so that the indication at each digit position of the meter M is exactly proportional to the magnitude of the current flowing through one of the resistors $R_0$ through $R_9$ which in turn is dependent upon the value of the resistor through which the current flows. However, this data collection system has not been satisfactory in practice for exactly reading the indication of the meter M because the values of the resistors $R_0$ through $R_9$ vary depending upon the environmental temperature and the resistance of the data transmission lines $l_1$, $l_2$ and $l_3$ varies depending upon the distance from the data collection station to a respective terminal equipment.

Therefore, one of the objects of the present invention is to provide a three-data-transmission-line type data collection system which is completely immune to the environmental temperature and the distance from a data collection station to a terminal equipment or meter.

Another object of the present invention is to provide a three-data-transmission-line type data collection system which may digitally collect the data from the terminal equipment by reading the indication of the terminal equipment in synchronism with clock pulses transmitted from the data collection station.

Figure 2:
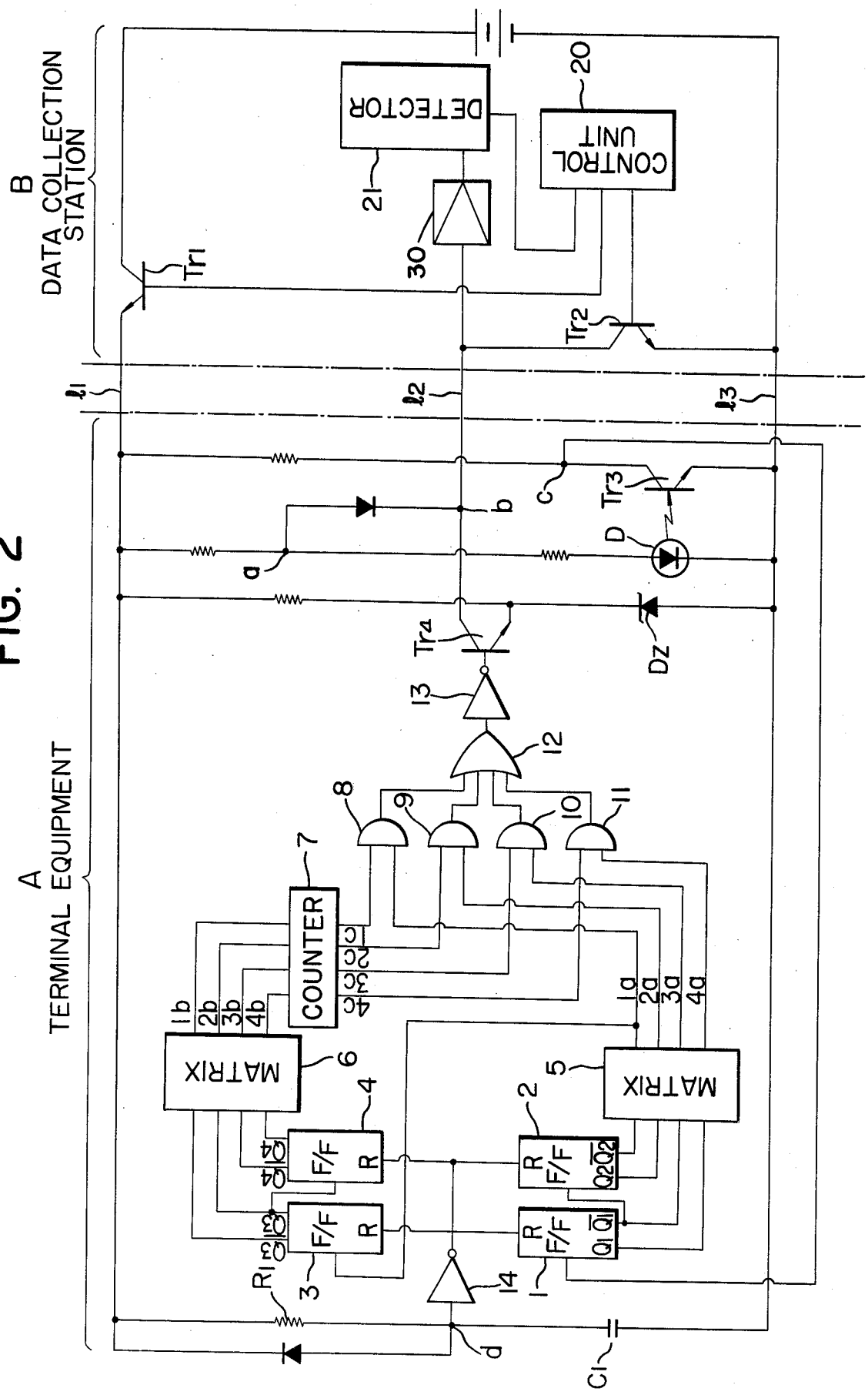
FIG. 2 is a circuit diagram of a three-data-transmission-line type data collection system in accordance with the present invention.

Referring to FIG. 2, the data collection system in accordance with the present invention comprises a terminal equipment A and a data collection station B interconnected with three data transmission lines $l_1$, $l_2$ and $l_3$. The terminal equipment A is installed for each consumer for measuring, registering and transmitting the amount of electricity, water or gas consumed.

In operation, a control unit 20 in the data collection station B enables a transistor $Tr_1$ to read or collect the data or contents in the counter 7 in the terminal equipment A. When the transistor $Tr_1$ is enabled, a power source voltage is transmitted through the power feed line $l_1$ and the common transmission line $l_3$ to the terminal equipment A so that a light emitting diode D is energized and consequently a phototransistor $Tr_3$ is enabled. As a result, the potential at a point c drops to a low level. While the potential at a point d rises gradually to a high level with a time delay predetermined by a time constant of an integrating circuit consisting of a resistor $R_1$ and a capacitor $C_1$. When the potential at the point d is maintained at a low level, the same potential is derived from an inverter 14, and when the output from the inverter 14 reaches a predetermined level or a threshold value of flip-flops 1, 2, 3 and 4, the latter are reset. When the potential at the point d rises to a threshold value of the inverter 14, the output therefrom drops to a low level so that the automatic resetting of the flip-flops 1 through 4 may be accomplished.

The flip-flops 1 and 2 make up a first four-bit or modulo-4 counter for sequentially selecting the binary digit positions in each of the decimal digit positions 1m through 4m in the counter 7 and reading the binary digit in the selected binary digit position as will be described in detail below. The flip-flops 3 and 4 also make up a second four-bit or modulo-4 counter for selecting the decimal digit positions 1m through 4m in the counter 7, and is incremented by one for each return to zero of the first four-bit or modulo-4 counter consisting of the flip-flops 1 and 2.

Figure 3:
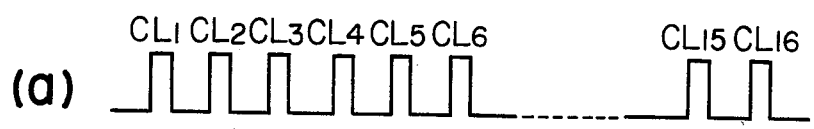
FIG. 3 shows pulse trains used for the explanation of the mode of operation of the data collection system.
Figure 3:
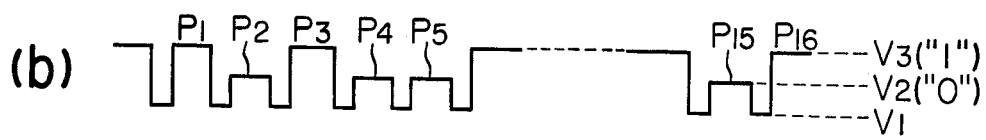

When a clock pulse $CL_1$ [See FIG. 3(a)] is applied to the base of a transistor $Tr_2$ in the data collection station B, the transistor $TR_2$ is enabled so that the potential at the points a and b drop to a low level $V_1$ [See FIG. 3(b)] and consequently the light emitting diode D in the terminal equipment A is disabled. As a result, the phototransistor $Tr_3$ is disabled. The light emitting diode D and the phototransistor $Tr_3$ make up a photocoupler.

Figure 4:
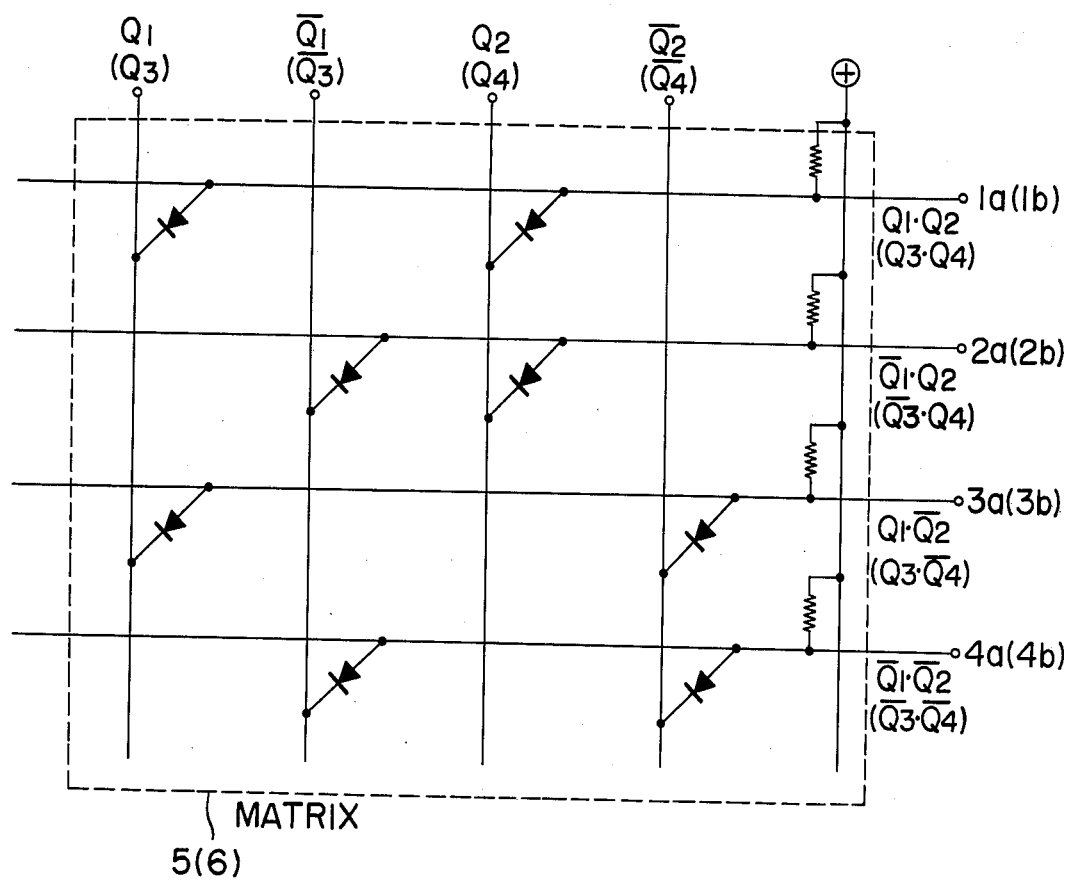
FIG. 4 is a detailed diagram of matrix circuits 5 and 6 shown in FIG. 2.

The binary digit position selecting matrix 5 is as shown in FIG. 4. When the transistor $Tr_3$ is disabled, the potential at the point c rises and the flip-flop 1 is consequently set so that the first row 1a of the binary digit position selecting matrix 5 may be selected. In response to the output from the first row 1a of the matrix 5 the flip-flop 3 in the second counter is set so that the first row 1b of the decimal digit position selecting matrix 6 may be selected. The matrix 6 is substantially similar in construction to the matrix shown in FIG. 4, and the terminals of the matrix 6 are shown in parentheses.

Figure 5:
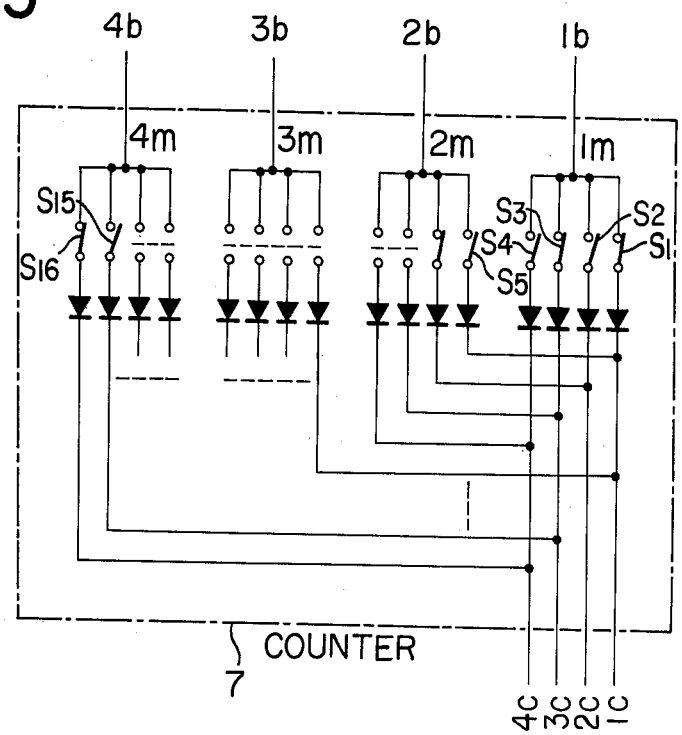
FIG. 5 is a circuit diagram of a counter 7 shown in FIG. 2.

In FIG. 5 there is shown a circuit diagram of the counter 7. When the digit in the decimal unit position 1m is for instance "5", its corresponding binary representation is "0 1 0 1". That is, contacts $S_1$ and $S_3$ are closed while contacts $S_2$ and $S_4$ are opened.

Thus when the clock pulse $CL_1$ is applied to the base of the transistor $Tr_2$, the first row 1a of the binary digit position selecting matrix 5 and the first row 1b of the decimal digit position selecting matrix 6 are selected and the contact $S_1$ of the counter 7 is closed. Referring back to FIG. 2, therefore the logic "1" is derived through an AND gate 8 and an OR gate 12, and is applied to an inverter 13. The output from the inverter 13 is "0" so that the transistor $Tr_4$ is disabled and consequently the potential at the point b on the transmission line $l_2$ rises to a high level $V_3$ [See FIG. 3(b)]. A detector 21 in the data collection station B is coupled to line $l_2$ through an amplifier 30, and detects the data signal $P_1$ at high level $V_3$ as logic "1".

Thereafter, the clock pulse $CL_2$ is derived from the control unit 20 and is applied to the base of the transistor $Tr_2$. Then the flip-flop 1 is incremented to select the second row 2a of the digit matrix 5, but the flip-flop 3 remains in the set state. As a result, the output from the second row 2a of the digit matrix 5 and the output from the contact $S_2$ of the counter 7 are applied to an AND gate 9. Since the contact $S_2$ representing the binary digit in the second digit position of the unit digit 1m is opened, the output from the AND gate 9 is "0" so that the output from the OR gate 12 is also "0". As a result, the output from the inverter 13 is "1" so that the transistor $Tr_4$ is enabled and consequently the potential at the point b on the transmission line $l_2$ is maintained at an intermediate level $V_2$ which is determined by a zener diode Dz [See FIG. 3(b)] and which is detected as a data signal $P_2$ representing the logic "0". In like manner, in response to the clock pulses $CL_3$ and $CL_4$, the on-off conditions of the contacts $S_3$ and $S_4$ of the unit digit 1m of the counter 7 are detected. Thus the data collection station B reads "0 1 0 1" in the unit digit position 1m of the counter 7, and the flip-flops 1 and 2 are incremented.

In response to the clock pulse $CL_5$, the flip-flop 3 is reset to select the second row 2b of the digit position selecting matrix 6 so that the tens digit position 2m of the counter 7 is selected. The on-off condition of the contact $S_5$ in the first binary digit position of the tens digit position 2m is detected in a manner substantially similar to that described above, and the data signal $P_5$ is derived. In like manner, the on-off conditions of the contacts in the hundreds and thousands digit positions 3m and 4m are sequentially detected in response to the clock pulses CL. Finally in response to the last clock pulse $CL_{16}$ the on-off position of the contact $S_{16}$ of the thousands digit position 4m is detected, and the data signal $P_{16}$ is derived. Thus collecting the data from the terminal equipment A is completed.

In summary, according to the present invention, the transmission line $l_2$ is used as a common input-output line to transmit three-level signals. In response to the clock pulses transmitted from the data collection station, the data in the terminal equipment are transmitted to the data collection station in synchronism with the clock pulses so that the logical data collection may be effected. Furthermore, the data collection system of the present invention is not adversely affected by the environmental temperature, the variation in length of the transmission lines and the external noise.

What is claimed is:

1. In a data collection system wherein items of data from selected ones of a plurality of remotely located terminal equipment units are sequentially read out and transmitted to a data collection station through three transmission lines, namely (i) a power feed transmission line, (ii) a common transmission line, and (iii) a signal transmission line, said data collection station including (a) means for supplying a voltage to a selected terminal equipment unit through said power feed line and said common line, and (b) means for transmitting clock pulses to said selected unit through said common line and said signal line, the items of data from said selected unit being sequentially read out in response to said clock pulses and transmitted to said data collection station through said signal transmission line, the improvement comprising means for establishing the voltage on said signal transmission line at a base level when said clock pulses are of one polarity and for establishing said voltage at one of two data levels, both different from said base level, when said clock pulses are of opposite polarity, the data levels of said voltage on said signal transmission line corresponding to the items of data of said selected terminal equipment unit to be read out and transmitted.

2. A data collecting system comprising:

a plurality of remotely located terminal equipment units and a data collection station for obtaining data readings from selected ones of said units through three transmission lines, namely a power feed transmission line, a common transmission line, and a signal transmission line;

means at said data collection station for (i) supplying a voltage to a selected one of said terminal equipment units through said power feed line and said common line, and (ii) transmitting clock pulses to said selected unit through said common line and said signal line; and means at said selected terminal equipment unit for sequentially reading out items of data in response to said clock pulses and transmitting said items to said data collection station through said signal transmission line, said reading out and transmitting means comprising:

a binary coded decimal counter capable of counting four-digit decimal numbers; a first four-bit counter which is incremented in response to said clock pulses; and a second four-bit counter which is incremented by one for each circulation of the contents of said four-bit counter for sequentially selecting the digit positions of said binary coded decimal counter, and means for sequentially selecting and reading out the binary coded information in said selected digit position in response to the outputs from said first four-bit counter.

3. A data collection system as defined in claim 2 wherein said reading out and transmitting means further comprises a first diode matrix for logically processing the outputs from said first four-bit counter; a second diode matrix for logically processing the outputs from said second four-bit counter; means for sequentially selecting the digit positions of said binary coded decimal counter in response to the outputs from said second diode matrix; and means for sequentially selecting the binary digit positions of a binary coded decimal number in the selected digit position and for reading out a binary number in the selected binary digit position.

* * * * *